(12) United States Patent
Chamberlain et al.

(10) Patent No.: US 7,267,351 B2
(45) Date of Patent: Sep. 11, 2007

(54) FRAME ASSEMBLY FOR A BICYCLE

(75) Inventors: Jason L. Chamberlain, Morgan Hill, CA (US); Christopher P. D'Aluisio, Watsonville, CA (US)

(73) Assignee: Specialized Bicycle Components. Inc., Morgan Hill, CA (US)

( * ) Notice: Subject to any disclaimer, the term of this patent is extended or adjusted under 35 U.S.C. 154(b) by 0 days.

(21) Appl. No.: 11/247,023

(22) Filed: Oct. 11, 2005

(65) Prior Publication Data

US 2006/0027996 A1    Feb. 9, 2006

Related U.S. Application Data

(63) Continuation of application No. 10/985,384, filed on Nov. 10, 2004, now Pat. No. 6,953,202, which is a continuation of application No. 10/811,765, filed on Mar. 29, 2004, now Pat. No. 6,866,281, which is a continuation of application No. 10/135,052, filed on Apr. 29, 2002, now Pat. No. 6,712,373.

(60) Provisional application No. 60/372,982, filed on Apr. 15, 2002.

(51) Int. Cl.
*B62K 19/00* (2006.01)

(52) U.S. Cl. .................................... 280/281.1; 280/283

(58) Field of Classification Search ............. 280/281.1, 280/283, 284
See application file for complete search history.

(56) References Cited

U.S. PATENT DOCUMENTS

| 439,095 | A | | 10/1890 | Becker | |
|---|---|---|---|---|---|
| 447,741 | A | | 3/1891 | Semple | |
| 467,794 | A | | 1/1892 | Ellis | |
| 494,803 | A | | 4/1893 | Cable | |
| 516,554 | A | | 3/1894 | Smith | |
| 564,319 | A | | 7/1896 | Travis | |
| 578,615 | A | | 3/1897 | Travis | |
| 591,306 | A | * | 10/1897 | Tolson | ........................ 280/283 |
| 627,199 | A | * | 6/1899 | McDonnell | .................. 280/254 |
| 634,340 | A | * | 10/1899 | Harnett | ........................ 280/276 |
| 640,113 | A | * | 12/1899 | Dixon | ........................ 280/284 |

(Continued)

FOREIGN PATENT DOCUMENTS

AU    221626    9/1957

(Continued)

OTHER PUBLICATIONS

Specialized 2001 Product Brochure—1 page, 2001.
Taiwan Bicycle Guide 2000-2001 in 2 pages, 2001.

*Primary Examiner*—Kevin Hurley
(74) *Attorney, Agent, or Firm*—Knobbe, Martens, Olson & Bear, LLP

(57) ABSTRACT

A bicycle including a frame having a main frame portion and an articulating frame portion pivotally mounted to the main frame portion and carrying a rear wheel of the bicycle. A shock absorber preferably is operably connected between the main frame portion and the articulating frame portion. Preferably, the top tube and down tube of the main frame contact one another for a distance extending rearwardly from the head tube of the main frame. In one arrangement, the down tube has a non-circular cross-sectional shape.

13 Claims, 5 Drawing Sheets

U.S. PATENT DOCUMENTS

| | | | |
|---|---|---|---|
| 644,788 A | 3/1900 | Williams | |
| 667,594 A | 2/1901 | Soucy, Jr. | |
| 712,784 A | 11/1902 | Ellis | |
| 714,121 A | 11/1902 | Williams | |
| 1,039,943 A * | 10/1912 | Himes | 280/281.1 |
| 1,047,430 A | 12/1912 | Michaelson | |
| 1,101,614 A | 6/1914 | Bramham | |
| 1,106,867 A * | 8/1914 | Preund | 280/284 |
| 1,136,870 A | 4/1915 | Dukelow | |
| 1,272,399 A * | 7/1918 | Douglas | 280/284 |
| 1,283,030 A | 10/1918 | Ashton | |
| 1,298,958 A | 4/1919 | Johnston | |
| 1,407,218 A * | 2/1922 | Previtali | 280/284 |
| 1,517,146 A * | 11/1924 | Bloom | 280/286 |
| 2,078,213 A * | 4/1937 | Martin | 280/284 |
| 2,199,536 A | 5/1940 | Booty | |
| 2,863,672 A | 12/1958 | Murata | |
| 3,133,748 A * | 5/1964 | Gunnerson | 280/284 |
| 3,375,210 A | 3/1968 | D Onofrio | |
| 3,819,002 A | 6/1974 | Heathwaite et al. | |
| 3,931,990 A | 1/1976 | Knapp | |
| 3,964,765 A * | 6/1976 | Zenser | 280/276 |
| 4,039,200 A | 8/1977 | McGonegle | |
| 4,058,181 A | 11/1977 | Buell | |
| 4,299,582 A | 11/1981 | Leitner | |
| 4,322,088 A | 3/1982 | Miyakoshi et al. | |
| 4,421,337 A | 12/1983 | Pratt | |
| 4,440,413 A | 4/1984 | Miyakoshi et al. | |
| 4,457,393 A | 7/1984 | Tamaki et al. | |
| 4,529,056 A | 7/1985 | Kreuz | |
| 4,579,189 A | 4/1986 | Tanaka | |
| 4,582,343 A | 4/1986 | Waugh | |
| 4,679,811 A | 7/1987 | Shuler | |
| 4,688,816 A * | 8/1987 | Yang | 280/239 |
| 4,789,174 A | 12/1988 | Lawwill | |
| 5,000,470 A | 3/1991 | Kamler et al. | |
| 5,121,937 A | 6/1992 | Lawwill | |
| 5,129,665 A | 7/1992 | Sutter et al. | |
| 5,217,241 A | 6/1993 | Girvin | |
| 5,226,674 A | 7/1993 | Buell et al. | |
| 5,255,932 A | 10/1993 | Moore | |
| 5,269,551 A | 12/1993 | Martin et al. | |
| 5,316,327 A * | 5/1994 | Bell | 280/260 |
| 5,332,246 A | 7/1994 | Buell | |
| 5,337,861 A | 8/1994 | Romano | |
| 5,360,078 A * | 11/1994 | Rifenburg et al. | 180/227 |
| 5,370,411 A | 12/1994 | Takamiya et al. | |
| 5,403,028 A | 4/1995 | Trimble | |
| 5,445,400 A | 8/1995 | Martin et al. | |
| 5,509,679 A | 4/1996 | Leitner | |
| 5,678,837 A | 10/1997 | Leitner | |
| 5,725,227 A | 3/1998 | Mayer | |
| 5,762,353 A * | 6/1998 | Miller | 280/284 |
| 5,791,674 A | 8/1998 | D'Aluisio et al. | |
| 5,803,476 A | 9/1998 | Olson et al. | |
| 5,899,480 A | 5/1999 | Leitner | |
| 5,957,473 A | 9/1999 | Lawwill | |
| 5,975,550 A | 11/1999 | Schonfeld | |
| 6,036,213 A | 3/2000 | Busby | |
| 6,056,307 A | 5/2000 | Busby et al. | |
| 6,076,845 A | 6/2000 | Lawwill | |
| 6,092,823 A | 7/2000 | Busby | |
| 6,102,421 A | 8/2000 | Lawwill et al. | |
| 6,131,934 A | 10/2000 | Sinclair | |
| 6,164,676 A | 12/2000 | Wilcox | |
| 6,203,042 B1 | 3/2001 | Wilcox | |
| 6,270,104 B1 * | 8/2001 | Nelson et al. | 280/281.1 |
| 6,361,059 B1 | 3/2002 | Ellsworth | |
| 6,439,593 B1 | 8/2002 | Tseng | |
| 2005/0253357 A1 * | 11/2005 | Chang et al. | 280/283 |

FOREIGN PATENT DOCUMENTS

| | | |
|---|---|---|
| BE | 383892 | 5/1954 |
| DE | 3937368 A1 | 5/1991 |
| EP | 1 238 900 A2 | 9/2002 |
| FR | 986467 | 3/1949 |
| FR | 2673906 A1 * | 9/1992 |
| FR | 2687976 A1 * | 9/1993 |
| GB | 220760 | 8/1924 |

* cited by examiner

FRAME ASSEMBLY FOR A BICYCLE

RELATED APPLICATIONS

This application is a continuation of U.S. patent application Ser. No. 10/985,384, filed Nov. 10, 2004, now U.S. Pat. No. 6,953,202, which is a continuation of U.S. patent application Ser. No. 10/811,765, filed Mar. 29, 2004, now U.S. Pat. No. 6,866,281, which is a continuation of U.S. patent application Ser. No. 10/135,052, filed Apr. 29, 2002, now U.S. Pat. No. 6,712,373, which claims priority from U.S. Provisional Patent Application No. 60/372,982, filed Apr. 15, 2002.

INCORPORATION BY REFERENCE

The entireties of U.S. patent application Ser. No. 10/985,384, filed Nov. 10, 2004; Ser. No. 10/811,765, filed Mar. 29, 2004; and No. 10/135,052, filed Apr. 29, 2002 and U.S. Provisional Patent Application No. 60/372,982, filed Apr. 15, 2002 are hereby expressly incorporated by reference herein and made a part of this specification.

BACKGROUND OF THE INVENTION

1. Field of the Invention

The present invention relates generally to bicycles. More particularly, the present invention relates to a bicycle frame preferably including a rear wheel suspension assembly suitable for use in connection with off-road bicycles.

2. Description of the Related Art

Off-road bicycles, or mountain bikes, may be equipped with front and rear suspension assemblies operably positioned between the front and rear wheels, respectively, and the frame of the bicycle. Providing front and rear suspension on a mountain bike potentially improves handling and performance by absorbing bumps, and other rough trail conditions, which may be encountered while riding off-road. However, because mountain bikes are typically pedal-driven, i.e., use the rider's power output to propel the bicycle, the provision of rear suspension, especially, may undesirably absorb a rider's power output, resulting in wasted effort.

Accordingly, rear suspension systems commonly incorporated on engine-driven vehicles, such as motorcycles, have proven ineffective for use with pedal-driven vehicles, such as mountain bikes. In addition, because a mountain bike is propelled solely by power output from the rider, it is desirable that the rear suspension assembly be lightweight. Rear suspension systems of engine-driven vehicles commonly emphasize strength over weight and, therefore, have not been widely incorporated on mountain bikes.

Mountain bike rear suspension designs utilizing multiple linkage members are currently used and are often effective at isolating pedal-induced and brake-induced forces from acting on the rear suspension. However, one problem associated with prior mountain bike rear suspension designs involves placement of the rear shock absorber. Due to the relatively complex nature of common mountain bike rear suspension assemblies, the placement of the rear shock absorber has often precluded the use of a traditional triangular mainframe of the mountain bike. For example, typical rear shock placement has either precluded the use of a vertical seat tube member of the mainframe, or has been positioned within the internal space defined by the mainframe. As the down tube and the seat tube members of the mainframe have traditionally been provided with mounts, or bosses, for mounting of water bottle cages, many designs incorporating rear suspension assemblies have inhibited the use of one, or both, of the traditional water bottle cage locations due to the placement of the rear shock absorber.

Another problem with prior art bicycles that incorporate front and rear suspension is that the frame designs that have evolved to provide increasing amounts of front and rear wheel suspension travel have not properly addressed the increased force that is imparted on the frame due to the increased moment arm resulting from the increased length of the front suspension fork.

SUMMARY OF THE INVENTION

Preferred embodiments of a bicycle include a frame assembly that provides rear suspension and addressed the loads applied to the frame as a result of the moment arm of the front suspension fork. Preferably, a lower surface of the top tube contacts an upper surface of the down tube along a distance extending rearwardly from the head tube. In one arrangement, the down tube has a non-circular cross-sectional shape.

A preferred embodiment is a bicycle including a front wheel, a rear wheel and a frame assembly. The frame assembly includes a main frame and a sub-frame, which is moveable relative to the main frame and configured to carry the rear wheel. The main frame includes a head tube, a seat tube, a top tube and a down tube. The top tube and the down tube are connected to the head tube and extend in a rearward direction from the head tube toward the seat tube. The down tube curves away from the top tube when moving along the down tube in a rearward direction from the head tube. An upper surface of the top tube contacts a lower surface of the head tube along a contact distance extending rearward from the head tube. The frame assembly additionally includes a gusset extending between a forward surface of the seat tube and an upper surface of the top tube.

A preferred embodiment is a bicycle including a front wheel, a rear wheel and a frame assembly. The frame assembly includes a main frame and a sub-frame, which is moveable relative to the main frame and configured to carry the rear wheel. The main frame includes a head tube, a top tube and a down tube. The top tube and the down tube are connected to the head tube and extend in a rearward direction from the head tube. The down tube curves away from the top tube when moving along the down tube in a rearward direction from the head tube. An upper surface of the top tube contacts a lower surface of the head tube along a contact distance extending rearward from the head tube.

A preferred embodiment is a bicycle including a front wheel, a rear wheel and a frame assembly. The frame assembly includes a main frame and a sub-frame, which is moveable relative to the main frame and configured to carry the rear wheel. The main frame includes a head tube, a top tube and a down tube. The top tube and the down tube are connected to the head tube and extend in a rearward direction from the head tube. The down tube curves away from the top tube when moving along the down tube in a rearward direction from the head tube. An upper surface of the top tube contacts a lower surface of the head tube along a contact distance extending rearward from the head tube. The down tube has a non-circular cross-sectional shape. A shock absorber is connected to and extends between the main frame and the sub-frame.

BRIEF DESCRIPTION OF THE DRAWINGS

These and other features, aspects and advantages of the present invention are described below with reference to a preferred embodiment, that is intended to illustrate, but not to limit the present invention. The drawings contain five figures.

DETAILED DESCRIPTION OF THE PREFERRED EMBODIMENT

Figure 1:
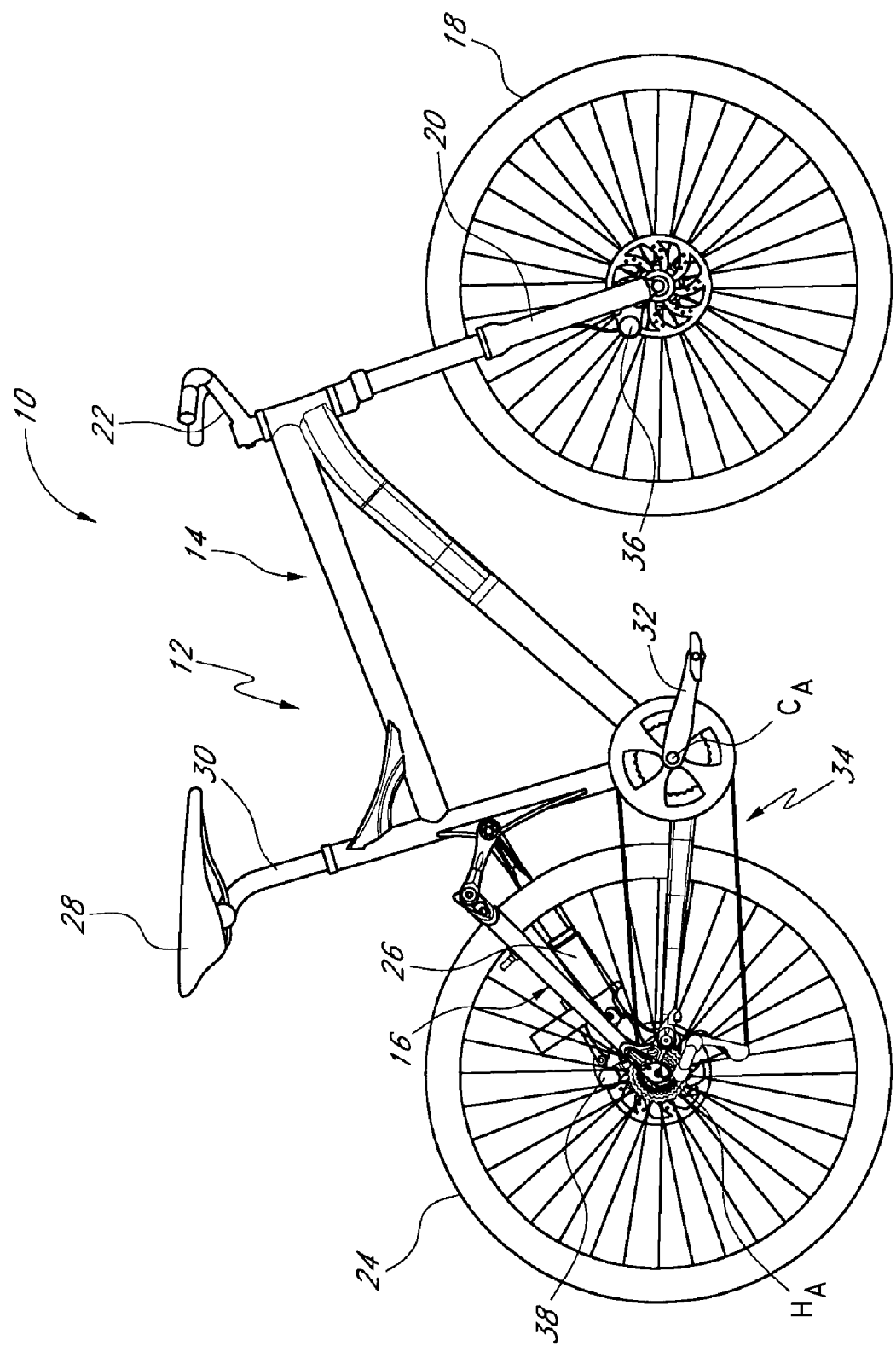
FIG. 1 is a side elevational view of an off-road bicycle, or mountain bike, incorporating a preferred frame and rear suspension assembly.

FIG. 1 illustrates an off-road bicycle, or mountain bike 10, including a preferred rear suspension assembly. The bicycle 10 is described herein with reference to a coordinate system wherein a longitudinal axis extends from a forward end to a rearward end of the bicycle 10. A vertical, central plane $C_P$ generally bisects the bicycle 10 and contains the longitudinal axis. A lateral axis extends normal to the longitudinal axis and within a horizontal plane. In addition, relative heights are generally expressed as elevations in reference to a horizontal surface on which the bicycle 10 is supported in an upright position. Similarly, relative forward and rearward positions are expressed as distances in reference to a vertical axis, which is normal to the horizontal surface. The above-described coordinate system is provided for the convenience of describing the embodiment illustrated in FIGS. 1-5, and is not intended to limit the scope of the present invention.

The bicycle 10 includes a frame 12 comprised of a generally triangular mainframe portion 14 and an articulating frame portion, or subframe 16. The subframe 16 is pivotally connected to the mainframe 14, as is described in greater detail below.

The bicycle 10 also includes a front wheel 18 carried by a front suspension assembly, or front fork 20. A steerer tube (not shown) is journaled for limited rotation about a steering axis defined by the mainframe 14. The fork 20 is secured to the mainframe 14 by a handlebar assembly 22, as is well known in the art.

A rear wheel 24 of the bicycle 10 is carried by the subframe 16. A shock absorber 26 is pivotally connected to both the mainframe 14 and the subframe 16 to provide resistance to the pivoting motion of the subframe 16 and, thus, provide resistance to the suspension travel of the rear wheel 24.

In addition, a seat 28 is connected to the frame 14 by a seat post 30, which is received within the seat tube 42. The seat 28 provides support for a rider of the bicycle 10. A pedal crank assembly 32 is rotatably supported by the mainframe 14 and drives a multi-speed chain drive arrangement 34, as is well known in the art.

The bicycle 10 also includes front and rear brake systems 36, 38 for slowing and stopping the bicycle 10. Although the front and rear brakes 36, 38 are illustrated as disc type brakes, alternatively, rim type brakes may be provided, as will be appreciated by one of skill in the art. Rider controls (not shown) are commonly provided on the handlebar assembly 22 and are operable to control shifting of the multi-speed chain drive arrangement 34 and front and rear brake systems 36, 38.

With reference to FIGS. 2-5, the bicycle frame 12 and rear shock absorber 26 are illustrated with the remaining components of the bicycle 10 removed for clarity. As described above, the bicycle frame 12 is primarily comprised of a mainframe portion 14 and an articulating frame portion, or subframe 16.

Figure 2:
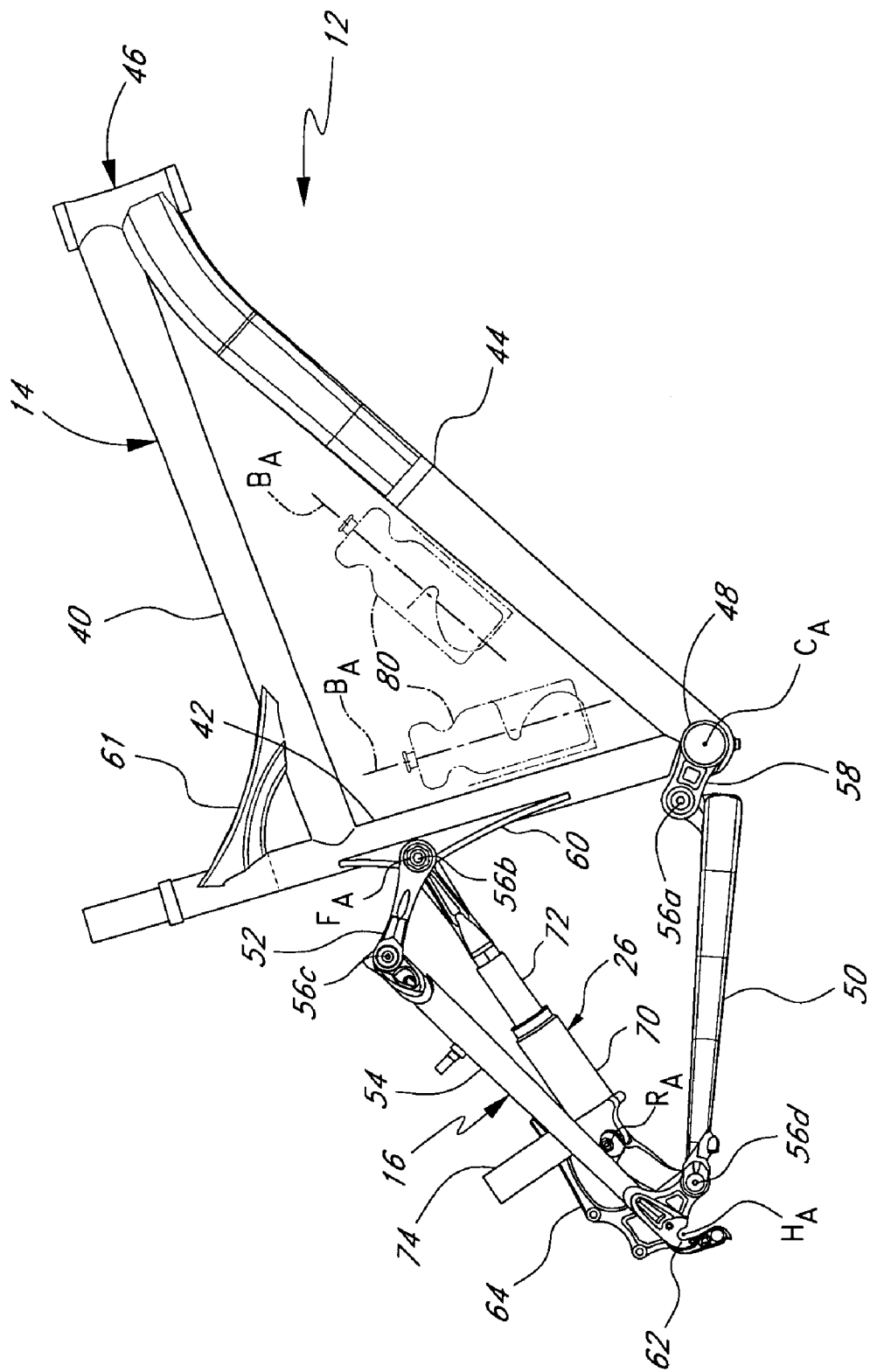
FIG. 2 is a side elevational view of the bicycle frame and rear suspension assembly of FIG. 1 with certain components of the bicycle removed for clarity.

With reference to FIG. 2, the mainframe 14 includes a top tube 40, a seat tube 42 and a down tube 44 connected to form a generally triangular shape. The top tube 40, seat tube 42 and down tube 44 also define a generally triangular space between them. The seat tube 42 extends in an upward direction and, preferably, slightly skewed in a rearward direction from a horizontal plane. The top tube 40 and down tube 44 extend in a forward direction from the seat tube 42 and connect to a head tube 46. The head tube 46 rotatably supports the steerer tube (not shown) of the front fork 20, as described above.

A bottom bracket shell 48 preferably is provided at the junction between the seat tube 42 and the down tube 44. The bottom bracket shell 48 rotatably supports the pedal crank assembly 32, as described above in relation to FIG. 1, in a manner well known in the art.

As described above, the subframe 16 is pivotally connected to the mainframe 14 and supports the rear wheel 24 of the bicycle 10. The subframe 16 is configured to allow the rear wheel 24 to move generally vertically along a curvilinear path from a first, i.e., extended or relaxed, position of the subframe 16 to a second, or compressed, position of the subframe 16. This motion permits the rear wheel 24 and suspension assembly to absorb bumps that may be encountered during use of the bicycle 10.

A lower arm 50 and a link 52 are pivotally connected to the mainframe 14 at their respective forward ends. An upper arm 54 is pivotally connected to the lower arm 50 at its lower end and the link 52 at its upper end. Thus, the upper arm 54 is carried by the lower arm 50 and the link 52 and, desirably, carries the rear wheel 24 of the bicycle 10.

Figure 3:
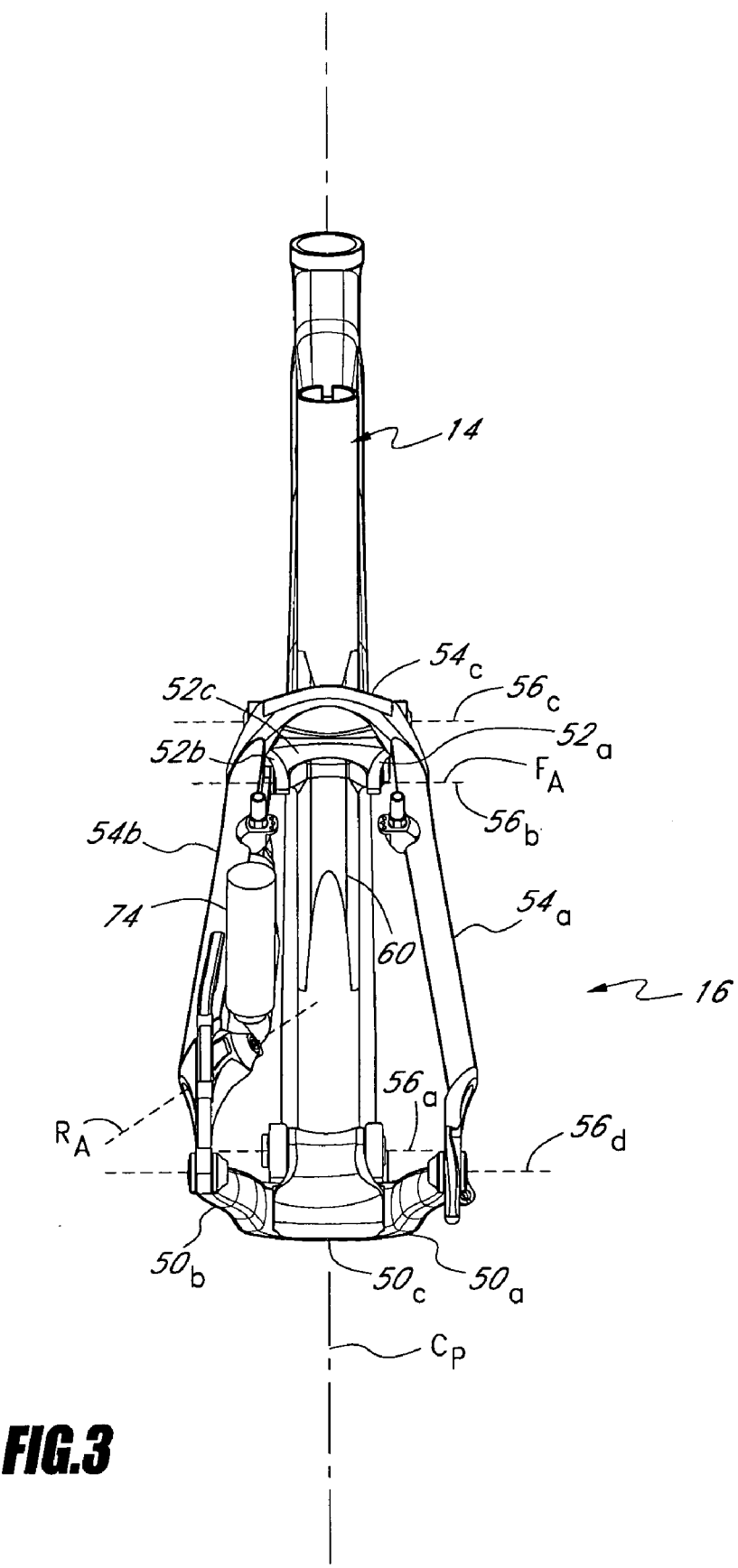
FIG. 3 is a rear elevational view of the bicycle frame of FIG. 2.
Figure 4:
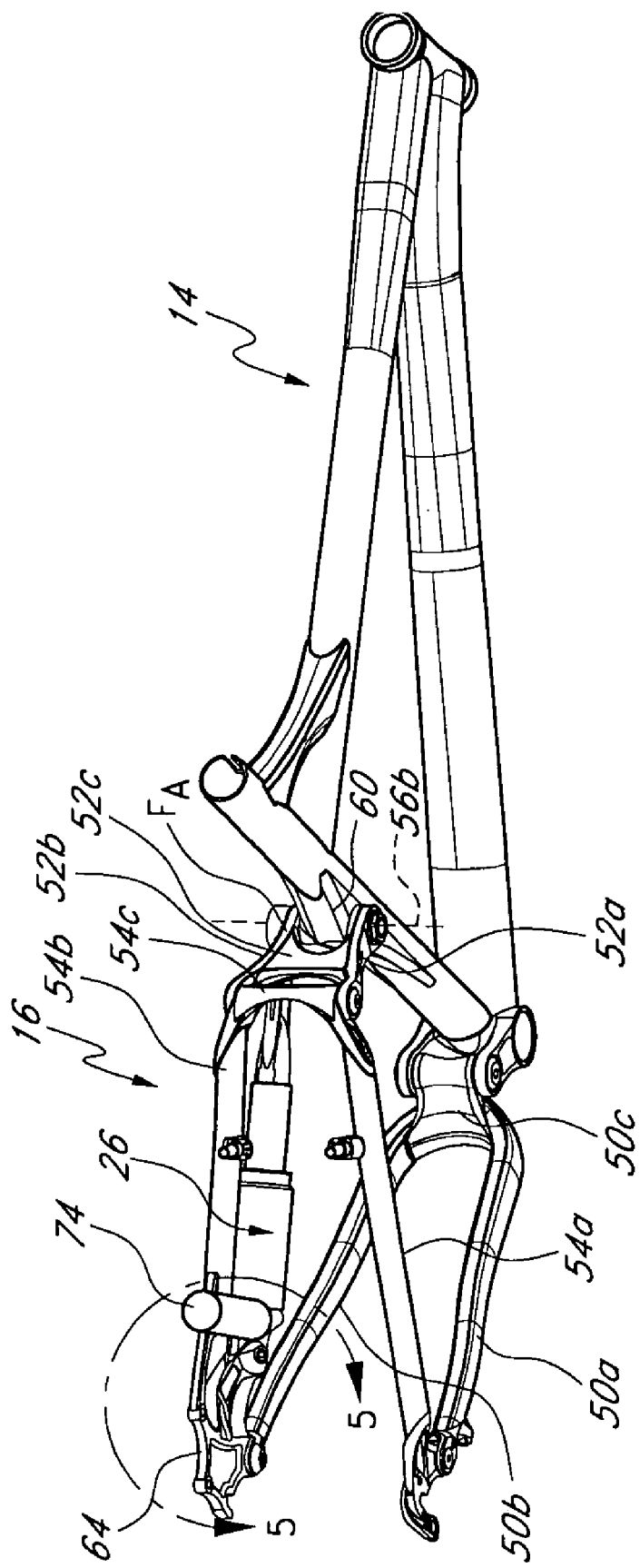
FIG. 4 is a perspective view showing the top, right and rear sides of the bicycle frame of FIG. 2.

With reference to FIGS. 3 and 4, each of the lower arm 50, link 52 and upper arm 54 include a pair of arm portions, which are positioned on opposing sides of the rear wheel 24. That is, the mainframe 14 and wheels 18, 24 lie substantially in a central, vertical plane $C_P$ of the bicycle 10 and each of the lower arm 50, link 52 and upper arm 54 desirably include arm portions spaced laterally on each side of the central plane. Alternatively, a single-sided subframe assembly may be provided which includes arm portions on only one side of the rear wheel 24, as will be appreciated by one of skill in the art. The illustrated design is preferred, however, for superior strength, balance and low weight.

Both the main frame 14 and the subframe 16 preferably are constructed from tubular pieces of metal. Preferably, the tubes are made of aluminum or steel, however, other suitable materials, such as composites for example, may also be used. The individual tubes comprising the bicycle frame 12 may be joined by any suitable process, such as welding, brazing, or bonding, for example. Alternatively, all, or a portion, of the main frame 14 and/or subframe 16 may be a unitary structure.

In the illustrated embodiment, the lower arm 50, also referred to as the swing arm or chain stay, includes right and left arm portions 50a, 50b (as viewed from the rear of the bicycle 10). Desirably, a bridge portion 50c interconnects the forward ends of the right and left lower arms 50a, 50b to inhibit twisting of the arm portions 50a and 50b in response to lateral forces. Similarly, the upper arm 54 includes a right arm portion 54a and a left arm portion 54b interconnected by a bridge portion 54c at their respective upper ends. Desirably, the link 52 also includes a right arm portion 52a and a left arm portion 52b. Preferably, the right arm and left arm portions 52a, 52b are interconnected by a bridge portion 52c extending therebetween at approximately the mid-point of each link arm 52a, 52b.

As described above, the mainframe 14, lower arm 50, link 52 and upper arm 54 are interconnected by a plurality of pivotal connections, generally referred to by the reference numeral 56. The location of the pivots 56 and the relative lengths and relative angles of the lower arm 50, link 52 and upper arm 54 advantageously isolate pedal-induced and brake-induced forces from causing unwanted pivoting motion of the subframe 16. This is achieved, at least in part, by providing a near-vertical travel path of the rear wheel 24, as described above.

Preferably, the pivot 56a between the lower arm 50 and the mainframe 14 is located above a crank axis $C_A$, generally defined by a central axis of the bottom bracket shell 48. In the illustrated embodiment, a bracket 58 is desirably connected to the mainframe 14 near the bottom bracket shell 48 and, preferably, extends both rearwardly and upwardly to receive a forward end of the lower arm 50 at the pivotal connection 56a.

The pivot 56b between the link 52 and the mainframe 14 is desirably located on, or near, the seat tube 42. The seat tube 42 provides an advantageous location to mount the subframe 16 and, specifically, the link 52 because of the strength of the seat tube 42, which is due at least in part to the inherent strength and rigidity of the triangular arrangement of the main frame 14. Accordingly, the entire bicycle frame 12 is strong and laterally rigid without requiring the arms 50, 54 or link 52 of the subframe 16 to be made larger or thicker. As a result, the entire frame 12 can be relatively lightweight, while remaining desirably strong.

Preferably, a bracket 60 is connected to the seat tube 42 and the forward end of the link 52 is pivotally connected to the bracket 60 at the pivot 56b. In addition to supporting the link 52, the bracket 60 desirably acts as a gusset, to further improve the seat tube's 42 resistance to bending and torsional forces.

In the illustrated embodiment, a rear end of the top tube 40 is connected to the seat tube 42 in proximity to the pivot 56b. Accordingly, forces transmitted from the subframe 16 and shock absorber 26 to the mainframe 14 are directed substantially along the longitudinal axis of the top tube 40. That is, a compressive force is exerted on the top tube 40. Because a tubular member's axial strength (i.e., tensile or compressive strength) is typically greater than it's radial, or bending, strength, the seat tube 42 of the preferred arrangement supports, and substantially prevents bending or torsion of, the seat tube 42. Advantageously, the distance between the junction of the top tube 40 and the seat tube 42 and the pivot 56b is less than four inches and, preferably, is less than two and one-half inches.

Additionally, the location of the connection between the top tube 40 and the seat tube 42 relative to the location of the pivot 56b desirably remains substantially constant for all the different sizes of the bicycle frame 12. Accordingly, the top tube 40 advantageously provides support for the seat tube 42 in resisting forces transmitted by the subframe 16 or shock absorber 26 independent of the frame size. However, desirably, the length of the seat tube 42 extending above the top tube 40 may vary according to frame size, as illustrated in phantom in FIG. 2. For some, or all, of the frame sizes, a gusset 61 may extend upward from the top tube 40 to the seat tube 42 to provide additional support to the portion of the seat tube 42 above the top tube 40. Alternatively, or additionally, the seat tube 42 may be shaped, i.e., deformed into a non-circular cross-section, to increase the tubes resistance to bending or torsion, as will be appreciated by one of skill in the art.

A pivotal connection 56c between a rear end of the link 52 and an upper end of the upper arm 54 is desirably positioned above the pivot 56b between the forward end of the link 52 and the mainframe 14. That is, the pivot 56c preferably is located vertically higher that the pivot 56b when the subframe 16 is in its relaxed, or extended position. Desirably, the pivot 56c is located at, or near the bridge portion 54c of the upper arm 54.

A pivotal connection 56d between the upper arm 54 and the lower arm 50 is desirably positioned below a dropout 62 formed on the upper arm member 54. The dropout 62 supports an axle (not shown) of the rear wheel 24, as is known in the art. The axle of the rear wheel 24 defines an axis of rotation of the rear wheel 24, or a hub axis $H_A$. Accordingly, the hub axis $H_A$ desirably is located above the pivot 56d. Desirably, the connection 56d is located at, or near, one of the rearward end of the lower arm 50 and the lower end of the upper arm 54. Preferably, the connection 56d is less than about five inches and, more preferably, less than about two inches from one of the rearward end of the lower arm 50 and the lower end of the upper arm 54

The above-described pivot locations have been found to advantageously isolate pedal-induced and brake-induced forces from being transmitted to the rear suspension of the bicycle 10. As such, these pivot locations are preferred locations. In addition, it is preferred that an imaginary line extending between the pivots 56a and 56d crosses an imaginary line extending between the hub axis $H_A$ and the crank axis $C_A$. Alternatively, other relative lengths and angles of the subframe 16 members and/or other pivot locations may also be used. For example, the pivot 56a between the mainframe 14 and the lower arm 50 may alternatively be positioned below, or concentric with, the crank axis $C_A$. In addition, the pivot 56d between the lower arm 50 and the upper arm 54 may alternatively be positioned above the hub axis $H_A$, resulting in the rear wheel 24 being carried by the lower arm 50. Also, the link 52 may be longer than the illustrated embodiment, and may even be approximately the same length as the lower arm 50, such that the upper arm 54 is held in an approximately vertical orientation. In addition, other modifications apparent to one of skill in the art may also be incorporated.

Desirably, one or more bearing assemblies are provided at each pivot 56 to permit smooth pivoting motion of the rear suspension. Alternatively, bushings or other suitable constructions may also be used, as may be determined by one of skill in the art.

As mentioned above, the rear shock absorber 26 is operably positioned between the subframe 16 and the mainframe 14 to provide resistance to articulating movement of the subframe 16 and, thus, the rear wheel 24. Preferably, a first, or forward, end of the shock absorber 26 is connected to the mainframe 14 and a second, or rearward, end of the shock absorber 26 is connected to the upper arm 54. However, the forward end of the shock absorber 26 may be connected to a member of the articulating frame portion, such as the link 52. In the illustrated embodiment, the forward end of the shock absorber 26 preferably is pivotally connected to the seat tube 42 of the mainframe 14. Preferably, the forward end of the shock absorber 26 is connected to the bracket 60 and a forward end pivot axis FA of the shock absorber 26 is coaxial with the pivot 56b between the link 52 and the mainframe 14.

Figure 5:
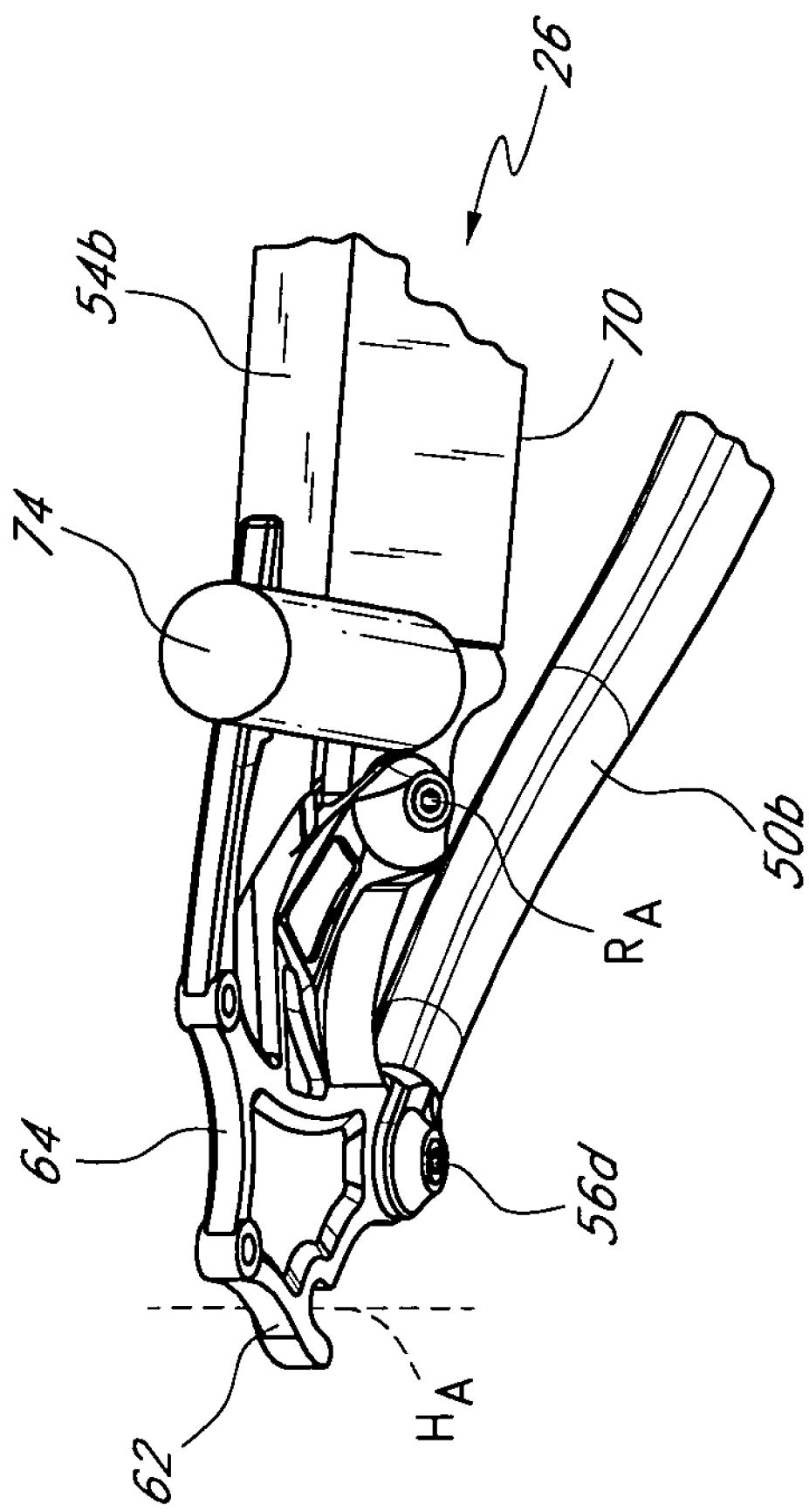
FIG. 5 is an enlarged perspective view of a rear brake bracket and a connection of the rear shock absorber to the bicycle frame indicated by the circle labeled with the reference numeral 5 in FIG. 4.

A bracket 64 is connected to the subframe 16 and, preferably, the upper arm 54 and is configured to support a rear brake assembly 38 (FIG. 1), as is known in the art. The bracket 64 preferably is welded to the subframe 16, however, other suitable connection methods may also be used. A second end of the shock absorber 26 is preferably connected to the bracket 64 and is pivotal about a rearward end pivot axis $R_A$. By connecting both the rear brake assembly 38 and the shock absorber 26 to one bracket 64, redundant brackets are eliminated thereby reducing the overall number of parts and the overall weight of the bicycle frame 12. As illustrated in FIG. 5, the bracket 64 preferably also includes the left-side dropout 62, which cooperates with the right-side dropout 62 to support the rear wheel 24 and define the hub axis $H_A$. In addition, the bracket 64 defines the left-side pivot 56d between the left upper arm portion 54b and the left lower arm portion 50b. That is, in a preferred embodiment, the left upper arm portion 54b is connected to the bracket 64, which is, in turn, connected to the left lower arm portion 50b.

The illustrated shock absorber 26 has a main shock body including a shock shaft portion 70 telescopingly engaged with a shock body portion 72. Desirably the shock absorber 26 provides both a spring force and a damping force, as is known in the art. The spring force is related to the relative position between the shock shaft 70 and the shock body 72 while the damping force is related to the relative speed between the shock shaft 70 and the shock body 72. The spring assembly may comprise an air spring assembly (as illustrated), a coil spring assembly, or other suitable suspension springs, as may be determined by one of skill in the art. In addition, the shock absorber 26 may be mounted in a reverse orientation from the illustrated embodiment. That is, the shock shaft 70 may be connected to the main frame 14 and the shock body 72 connected to the subframe 16, as will be appreciated by one of skill in the art.

Preferably, the damping system comprises a piston movable within a fluid cylinder of the shock absorber 26 and fixed for movement with one of the shock shaft 70 and shock body 72. The piston preferably forces hydraulic fluid within the fluid chamber through one or more restrictive flow paths to generate a damping force when the shock absorber 26 is both extending and compressing, as is known in the art. One or more flow paths may be provided for each of, or both, extending motion and compressing motion of the shock absorber 26. In addition, the restriction of one or more of the flow paths may be externally adjustable to permit adjustment of the damping force provided by the shock absorber 26.

Desirably, the fluid cylinder within the shock absorber 26 is connected to a reservoir chamber defined within a reservoir member 74 of the shock 26. Although the illustrated reservoir member 74 is directly connected to the main body of the shock absorber 26, alternatively, the reservoir 74 and shock absorber 26 may be connected by a hydraulic hose connection.

Desirably, an inertia valve arrangement is operably positioned between the fluid cylinder of the shock absorber 26 and the fluid chamber of the reservoir 74 and is arranged to selectively alter the damping force provided by the shock absorber 26. As will be appreciated by one of skill in the art, an inertia valve assembly commonly includes a inertia mass biased into a closed position, i.e., covering one or more fluid ports, by a biasing member, such as a coil spring.

When an acceleration force of acting on the shock absorber 26, along the direction of movement of the inertia mass, exceeds a predetermined threshold, the inertia mass opens against the biasing force of the spring to uncover the fluid ports. Hydraulic fluid is permitted to flow through the opened fluid ports, thereby increasing the total fluid flow within the shock absorber 26 and reducing the damping force. In the illustrated embodiment, the inertia valve preferably remains closed in response to accelerations originating at the sprung mass (i.e., the main frame 14 and rider of the bicycle 10) and opens in response to accelerations above a predetermined threshold, which originate at the unsprung mass (i.e., the subframe 16 and rear wheel 24 of the bicycle 10). An exemplary shock absorber incorporating an inertia valve arrangement is described in U.S. Pat. No. 6,267,400, which is assigned to the assignee of the present application.

By mounting the end of the shock absorber 26 closest to the inertia valve arrangement to the upper arm 54 at a position near the hub axis HA, inertia forces acting on the wheel 24 most effectively influence the inertia mass. In the illustrated embodiment, the inertia mass is positioned within the reservoir 74. Accordingly, the end of the shock absorber 26 to which the reservoir 74 is mounted, desirably is connected to the subframe 16 at a position, or pivot axis $R_A$, near the hub axis $H_A$ and, preferably, to a bracket 64 on the upper arm 54. Such an arrangement increases the sensitivity of the inertia valve. Alternatively, the reservoir 74 may be positioned at, or even rearward of, the hub axis $H_A$ to further increase the sensitivity of the inertia valve. Desirably, the rearward shock mount axis $R_A$ is located on one of the rearward half of the lower arm 50 and the lower half of the upper arm 54. Preferably, the shock mount axis $R_A$ is located within approximately five inches and, more preferably, within approximately four inches of the hub axis $H_A$.

Preferably, the shock absorber 26 is mounted to the bicycle frame 12 such that the main body (i.e., the shaft portion 70 and body portion 72) is positioned substantially within a perimeter defined in a generally vertical plane by the lower arms 50, link 52, upper arms 54 and portion of the main frame 14 between pivots 56a and 56b. With such an arrangement, the main body of the shock absorber 26 advantageously lowers the center of gravity of the bicycle 10 and is protected from damage by the lower arms 50, link 52, upper arms 54 and portion of the main frame 14. In the illustrated embodiment, the reservoir 74 is positioned substantially outside of the above-described perimeter. However, alternate positioning of the reservoir 74, from that shown, is also possible, including positioning the reservoir 74 within the perimeter.

With reference to FIGS. 3 and 4, preferably the reservoir 74 is positioned between the upper arm portions 54b and 54a and, more preferably, immediately adjacent to the left side upper arm portion 54b, to permit adequate clearance for the rear wheel 24 of the bicycle 10 between the reservoir 74 and the right side upper arm portion 54a. By positioning the reservoir 74 between the upper arm portions 54a, 54b, the reservoir 74 is substantially protected from damage.

Desirably, the rearward pivot axis $R_A$ of the shock absorber 26 is skewed relative to the forward pivot axis $F_A$ of the shock absorber 26 and the pivot axes 56 of the subframe 16. As mentioned above, the forward pivot axis $F_A$ and subframe pivot axes 56 desirably are substantially horizontal, or perpendicular to a vertical, longitudinal central plane $C_P$ of the bicycle. Such an arrangement permits increased clearance for the rear wheel 24 while retaining the shock absorber 26 substantially within a plane defined by the lower arm 50 and upper arm 54, to protect the shock absorber 26 from damage. With reference to FIG. 4, the forward end of the shock absorber 26 preferably is positioned to the outside of the left arm of the link 52b. That is, the left arm of the link 52b is positioned between the forward end of the shock 26 and the mounting bracket 60.

As mentioned above, the subframe 16 pivots with respect to the main frame 14 to move the rear wheel 24 along a wheel travel path. As will be appreciated by one of skill in the art, the travel path of the rear wheel 24 may be linear, curvilinear, or arcuate. The travel path defines a distance from the relaxed position of the subframe 16 to the compressed position of the subframe 16, as described above. Advantageously, with the preferred rear suspension assembly, a shock absorber 26 having a relatively large amount of travel (i.e., movement from the fully extended position to the fully compressed position, or stroke length) may be employed. Thus, for each incremental movement of the rear wheel 24 along its travel path, the shock absorber 26 compresses a greater amount than in prior art bicycle rear suspension designs. A long-travel shock absorber advantageously contains a greater amount of hydraulic fluid, which reduces heat build-up within the shock 26, thereby improving performance.

Preferably, the shock absorber 26 has from about one and one-half to two and one-half inches of travel and, more preferably, about one and three-quarters to two inches of travel. In addition, the average ratio of rear wheel 24 travel to shock absorber 26 travel desirably is less than about 2.6:1, preferably less than about 2:1 and, more preferably, is about 1.8:1.

With reference to FIGS. 1 and 2, the illustrated rear suspension assembly permits the use of a traditional, triangular arrangement main frame 14. This is due, at least in part, to the advantageous placement of the rear shock absorber 26 substantially within the subframe 16. Accordingly, a rider may insert his or her arm through the triangular space created by the main frame 14 and hoist the bicycle 10 onto his or her shoulder for carrying. This is often advantageous when sections of an off-road trail may be too difficult to traverse while riding. In addition, a pair of water bottle mounts may be provided in traditional locations on the seat tube 42 and down tube 44, so that bottle cages for holding water bottles 80 may be mounted thereto, as illustrated in phantom in FIG. 2. The placement of the water bottles 80 within the triangular space created by the main frame 14 permits convenient access to water bottles 80 and, importantly, permit two water bottles 80 to be carried. A significant number of bicycle frames utilizing rear suspension only provide one water bottle mount location, or provide a second water bottle mount in an inconvenient location, such as the underneath side of the down tube 44, for example.

As is conventional, preferred water bottle mounts commonly comprise a pair of threaded apertures spaced axially from one another within one side wall of a tube member of the bicycle frame 14. Threaded fasteners are used to mount a bottle holder, or cage, to the frame 14. The bottle cage is typically constructed from bent metal wire or tubing and is configured to support a water bottle 80 substantially parallel with a longitudinal axis of the tube member of the frame 14, such as the seat tube 42 and down tube 44 in the embodiment of FIG. 2.

A preferred bottle cage permits a water bottle 80 to be placed into or removed from the cage by a sliding motion along an axis $B_A$, which is substantially parallel to the longitudinal axis of the frame tube that the cage is mounted to. Thus, ample room within the triangular space of the frame 14 is necessary to be able to slide the water bottle 80 along the axis $B_A$ until it is removed from the cage. Such cages are preferred because of their low weight and ability to securely hold a water bottle 80, even when the bicycle 10 is ridden over rough terrain. More complex cages that permit use in smaller areas, such as cages that pivot sideways relative to the bicycle frame 12, are less preferred by cyclists because of their increased weight and potential to pivot undesirably when the bicycle 10 encounters rough terrain.

Preferred embodiments of the present bicycle frame 12 advantageously achieve a number of other benefits over prior bicycle frame designs. The provision of a triangular main frame 14 and not positioning the shock absorber 26 within the triangular space within the main frame 14 makes possible other desirable features of the present bicycle frame 12. For example, without being required to provide space along the axis of the seat tube 42 for the shock absorber 26, the seat tube 42/top tube 40 junction can be positioned vertically lower to provide a frame 12 having a low stand-over height. Stand-over height may be defined as the clearance of a rider straddling the top tube 40 of the bicycle 10 with both feet on the ground. Low stand-over height is especially beneficial in technical off-road bicycling, wherein the rider may have to remove his feet from the bicycle pedals unexpectedly. In addition, the low position of the top tube 40 combined with the low position of the rear shock absorber 26 produces a bicycle frame 10 with an advantageously low center of gravity. As will be appreciated by one of skill in the art, a low center of gravity generally improves the handling characteristics of a bicycle.

Furthermore, it is possible to produce a bicycle frame 12 having a relatively short seat tube 42 because it is not necessary to provide room within the triangular space of the main frame for the shock absorber 26. As a result, frames 12 may be produced to accommodate shorter riders, who may be unable to comfortably fit on many prior art bicycles incorporating rear suspension. In addition, the provision of a seat tube 42 that is uninterrupted by a shock absorber 26 permits the seat 28 to be temporarily lowered to allow a rider of the bicycle 10 to shift his or her body weight without being impeded by the seat 28. Lowering the seat 28 is especially advantageous during technical off-road riding including steep downhill sections, to permit a rider to easily shift his or her weight backward on the bicycle 10, for example.

Although this invention has been disclosed in the context of a preferred embodiment, it will be understood by those of skill in the art that the present invention extends beyond the specifically disclosed embodiments to other alternative embodiments and/or uses of the invention and obvious modifications and equivalents thereof. Accordingly, the invention is to be defined solely by the appended claims.

What is claimed is:

1. A bicycle, comprising:
    a front wheel;
    a rear wheel;
    a frame comprising a main frame portion and an articulating frame portion, said articulating frame portion comprising a multiple linkage assembly and carrying said rear wheel;
    a chain drive arrangement comprising a pedal crank configured to drive said rear wheel;
    a single shock absorber configured to produce substantially all of a spring force and a damping force in response to movement of said articulating frame portion relative to said main frame portion;
    wherein said shock absorber defines a longitudinal axis spaced from, and substantially parallel to, a central plane of said bicycle defined by said front and rear wheels.

2. The bicycle of claim 1, wherein at least a portion of said shock absorber is positioned along side said rear wheel.

3. The bicycle of claim 2, wherein one end of said shock absorber is coupled to said articulating frame portion within about five inches of a hub axis of said rear wheel.

4. The bicycle of claim 3, wherein the other end of said shock absorber is coupled to the main frame portion.

5. The bicycle of claim 1, wherein a ratio of travel of said rear wheel to travel of said shock absorber is less than about 2.6 to 1.

6. The bicycle of claim 1, wherein a ratio of travel of said rear wheel to travel of said shock absorber is less than about 2 to 1.

7. The bicycle of claim 1, wherein a ratio of travel of said rear wheel to travel of said shock absorber is less than about 1.8 to 1.

8. The bicycle of claim 1, wherein said multiple linkage assembly comprises a pair of lower arms, a pair of upper arms and a link.

9. The bicycle of claim 1, wherein a portion of said shock absorber is positioned between a link of said multiple linkage assembly and said rear wheel.

10. The bicycle of claim 1, wherein an individual linkage member of said multiple linkage assembly is coupled to said main frame portion for rotation about an axis, one end of said shock absorber being coupled to said main frame for rotation about said axis.

11. The bicycle of claim 1, wherein said articulating frame portion is coupled to said main frame portion for rotation about an axis, one end of said shock absorber being coupled to said main frame for rotation about said axis.

12. A bicycle, comprising:

a front wheel;

a rear wheel;

a frame comprising a main frame portion and an articulating frame portion, said articulating frame portion carrying said rear wheel;

a chain drive arrangement comprising a pedal crank configured to drive said rear wheel;

a single shock absorber configured to produce substantially all of a spring force and a damping force in response to movement of said articulating frame portion relative to said main frame portion;

wherein said shock absorber defines a longitudinal axis spaced from, and substantially parallel to, a central plane of said bicycle defined by said front and rear wheels, and said articulating frame portion further comprises a bracket that is a unitary structure and defines a dropout for receiving said rear wheel, said bracket rotatably supporting an end of said shock absorber.

13. The bicycle of claim 12, wherein said bracket further includes a brake mount.

* * * * *